United States Patent
Wang et al.

(10) Patent No.: US 6,813,736 B2
(45) Date of Patent: Nov. 2, 2004

(54) BLIND TRANSPORT FORMAT DETECTION FOR COMMUNICATION

(75) Inventors: Michael Mao Wang, Hawthrone Wioods, IL (US); Tyler A. Brown, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 367 days.

(21) Appl. No.: 09/973,339

(22) Filed: Oct. 9, 2001

(65) Prior Publication Data

US 2003/0091003 A1 May 15, 2003

(51) Int. Cl.$^7$ ............................................... G01R 31/28
(52) U.S. Cl. ..................... 714/712; 370/252; 370/465; 375/225
(58) Field of Search ................................. 714/712, 799, 714/704; 370/252, 465; 375/225, 341, 343; 709/204

(56) References Cited

U.S. PATENT DOCUMENTS 4,727,495 A  *  2/1988  Cheetham et al. .......... 709/204
6,175,590 B1 *  1/2001  Stein .......................... 375/225

* cited by examiner

Primary Examiner—Guy J. Lamarre
Assistant Examiner—Dipakkumar Gandhi
(74) Attorney, Agent, or Firm—Kenneth A. Haas; Lalita W. Pace

(57) ABSTRACT

A receiver (300) is provided that efficiently determines what transport format combination is currently being utilized by a transmitter (200) multiplexing (201) several transport channels onto a single over-the-air channel (209). The receiver (300) estimates the transmitted sequence and, not knowing the format combination being utilized, makes estimates of the information bits for each of the possible transport format combinations. CRC metrics are determined (one for each transport or data channel) for each possible transport format combination, and these CRC metrics are combined into a single transport format combination metric for the particular transport format combination being tested.

9 Claims, 3 Drawing Sheets

DATA STREAM 1 {TF$_{11}$=0 Kbps, TF$_{12}$=9.6 Kbps}
DATA STREAM 2 {TF$_{21}$=0, TF$_{22}$=300 Kbps}

300

BLIND TRANSPORT FORMAT DETECTION FOR COMMUNICATION

FIELD OF THE INVENTION

The present invention relates generally to communication systems and in particular, to blind transport format detection within such communication systems.

BACKGROUND OF THE INVENTION

During communication, a mobile unit may be transmitting several differing data streams (transport channels) over a single over-the-air channel. For example, control and application data may be multiplexed onto a single over-the-air channel transmitted to infrastructure equipment. Each data stream may be capable of being transmitted in several formats. For example, each data stream has its own bit rate, channel coding type, block size, transmission time interval (TTI). . . . , etc.

FIG. 1 illustrates the multiplexing of two data streams. Although each data stream may in actuality be capable of transmitting in many differing transport formats (TFs), for simplicity data streams 1 and 2 are shown having only two transport formats. As shown data stream 1 is capable of transmitting at 0 or 9.6 Kbps, while data stream 2 is capable of transmitting at 0 or 300 Kbps. That is, data stream 1 has two differing TFs, with $TF_{11}=0$ Kbps and $TF_{12}=9.6$ Kbps, while data stream 2 also has two differing transport formats with $TF_{21}=0$ Kbps and $TF_{22}=300$ Kbps.

At any given time, each data stream may be transmitting any of their various transport formats. For example, a transport format combination (TFC) of $TF_{11}=0$ Kbps, and $TF_{22}=300$ Kbps may be entering multiplexer 101. As illustrated in FIG. 1, there exists four transport format combinations, with $TFC1=\{TF_{11}, TF_{21}\}$, $TFC2=\{TF_{11}, TF_{22}\}$, $TFC3=\{TF_{12}, TF_{21}\}$, and $TFC4=\{TF_{12}, TF_{22}\}$. In general, if there exists I transport channels each of which has $J_i$ transport formats, there exists $$\prod_{i=1}^{I} J_i$$

possible transport format combinations.

During blind transport format detection, a receiver has no indication which of the $$K = \prod_{i=1}^{I} J_i$$

possible transport format combinations is being utilized by the transmitter. Prior-art solutions to the problem have dealt with determining the transport format of a single channel only. For example, section A.1.2 of the $3^{rd}$ Generation Partnership Project (3GPPP) TS 25.212 v3.5.0 describes a blind transport format detection of a single data channel using a cyclic-redundancy check (CRC). Such prior-art methods fail to describe the determination of a transport format where multiple data channels are multiplexed onto a single over-the-air channel. Therefore, a need exists for a blind transport format detection for a received signal that efficiently determines what transport format combination is currently being utilized by a transmitter multiplexing several transport channels onto a single over-the-air channel.

DETAILED DESCRIPTION OF THE DRAWINGS

Figure 1:
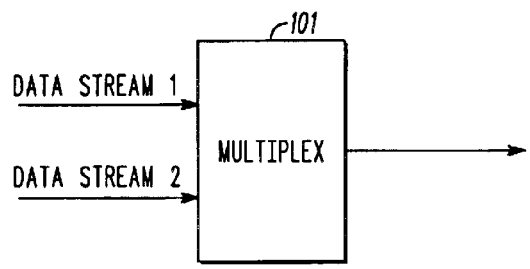
FIG. 1 illustrates prior-art data transmission.

To address the above-mentioned need, a receiver is provided that efficiently determines what transport format combination is currently being utilized by a transmitter multiplexing several transport channels onto a single over-the-air channel. The receiver described below estimates the transmitted sequence and, not knowing the transport format combination being utilized, makes estimates of the information bits for each of the possible transport format combinations. Cyclic Redundancy Check (CRC) metrics are determined (one for each transport or data channel) for each possible transport format combination, and these CRC metrics are combined into a single transport format combination metric for the particular transport format combination being tested.

Testing all possible transport format combinations results in multiple CRC metrics for each transport format combination, and a single transport format combination metric for each possible transport format combination. The transport format combination with the greatest transport format combination metric is the estimate of the transport format combination that is currently being utilized by the transmitter.

The present invention encompasses a method for blind transport format detection. The method comprising the steps of receiving an over-the-air signal comprising a plurality of transport channels multiplexed onto the over-the-air signal, wherein each of the plurality of transport channels comprises a plurality of transport formats, and determining a plurality of Cyclic Redundancy Check (CRC) metrics for each of the transport channels and a first transport format. In addition, a transport format combination metric is determined based on the plurality of CRC metrics and a transport format is determined based on the transport format combination metric.

The present invention additionally encompasses a method for blind transport format detection. The method comprises the steps of (a) receiving an over-the air signal comprising I data (transport) channels, (b) determining I Cyclic Redundancy Check (CRC) metrics for the I data channels, and (c) determining a transport format combination metric for the I data channels based on the CRC metrics for the I data channels. Steps b·c are repeated for each possible transport format combination, and a transport format combination is determined corresponding to a largest transport format combination metric.

The present invention additionally encompasses an apparatus comprising a de-multiplexer having a data stream as an input, wherein the data stream comprises a plurality of transport channels, each having a plurality of transport channel formats, the de-multiplexer outputting a plurality of channels based on a particular transport format combination, a plurality of Cyclic Redundancy Checking (CRC) circuitry, each having one of the plurality of channels as an input and outputting a CRC for the channel, and a logic unit having a plurality of CRC values as an input and outputting a transport format combination metric based on the plurality of CRC values.

Figure 2:
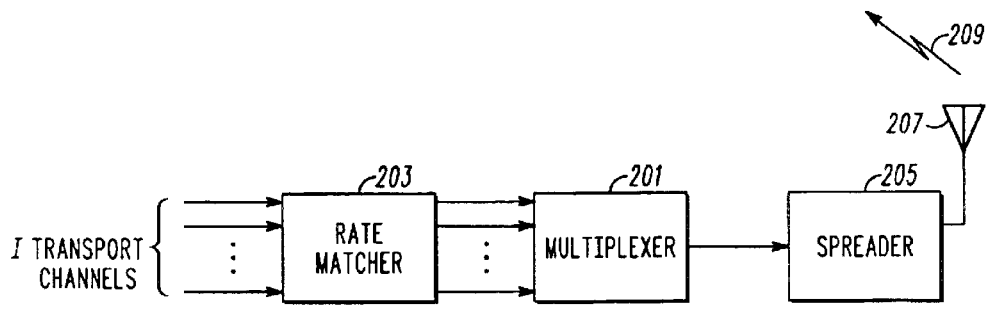
FIG. 2 is a block diagram of a transmitter in accordance with the preferred embodiment of the present invention.

Turning now to the drawings, wherein like numerals designate like components, FIG. 2 is a block diagram of transmitter 200 in accordance with the preferred embodiment of the present invention. As shown, transmitter 200 comprises, rate matcher 203, multiplexer 201, and spreader 205. As shown, I transport channels enters rate matcher 203, where information bits from each transport channel are punctured or repeated. The I outputs of the rate matcher 203 are multiplexed onto a single data stream identified as a Coded Composite Transport Channelchannel (CCTrCH). Spreader 205 spreads the data stream with a channelization code whose length is variable depending on the data rate of the CCTrCH and outputs a channel stream having a constant chip rate. In particular, since data entering spreader 205 may have one of many differing data rates, spreading circuitry 205 appropriately spreads the data with one of several available channelization codes in order to achieve a constant output chip rate. The channel stream is then modulated and transmitted via antenna 207.

In the preferred embodiment of the present invention transmitter 200 multiplexes several data channels (transport channels) onto a single over-the-air channel 209. Each transport channel has a plurality of transport formats suitable for transmission. As discussed above, for the I transport channels (each of which has $J_i$ transport formats), there exists K possible transport format combinations (TFCs), where $$K = \prod_{i=1}^{I} J_i.$$

While there exists methods for a receiver to determine a transport format when a single data channel (transport channel) is utilized, there currently exists no method to determine a transport format combination where several transport channels are multiplexed onto a single binary sequence. In order to solve this problem, the receiver of FIG. 3 is provided.

Figure 3:
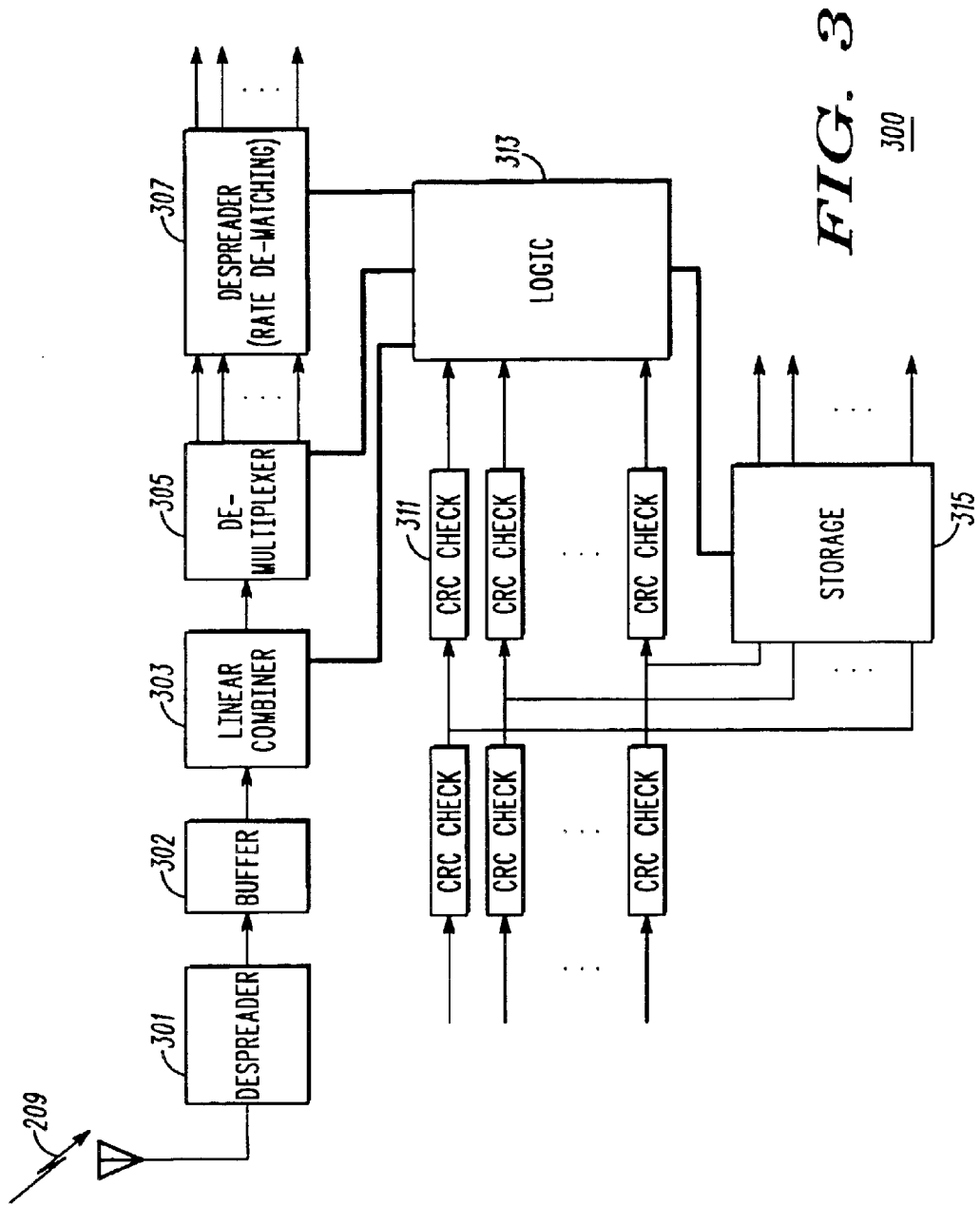
FIG. 3 is a block diagram of a receiver in accordance with the preferred embodiment of the present invention.

FIG. 3 is a block diagram of receiver 300 in accordance with the preferred embodiment of the present invention. As shown receiver 300 comprises despreader 301, rate de-matcher 307, de-multiplexer 305, decoder (not shown), CRC check 311, and logic unit 313. In the preferred embodiment of the present invention receiver 300 estimates the transmitted sequence and, not knowing the format combination being utilized, makes estimates of the information bits for each of the $$\prod_{i=1}^{I} J_i$$

possible transport format combinations. I CRC metrics are determined (one for each transport or data channel) for each possible transport format combination, and these I CRC metrics are combined into a single transport format combination metric for the particular transport format combination being tested. Testing all $$\prod_{i=1}^{I} J_i$$

possible transport format combinations results in I CRC metrics for each transport format combination, and a single transport format combination metric for each possible transport format combination. The transport format combination with the greatest transport format combination metric is the estimate of the transport format combination that is currently being utilized by transmitter 200.

Operation of receiver 300 occurs as follows: Logic unit 313 knows the possible transport formats via Layer-3 negotiation as described in TS section 8.2.5 of the $3^{rd}$ Generation Partnership Project (3GPPP) TS 25.331 v3.2.0. Over-the-air signal 209 enters de-spreader 301 and is despread according to the shortest channelization code used in the set of possible transport format combinations and stored in buffer 302. The despread signal is passed to a linear combiner 303 where appropriate combining to form a channel symbol for a first transport format combination ($TFC_n$) is accomplished. The linear combinations utilized by linear combiner 303 are based on the current transport format combination being utilized by the receiver. For example, suppose there are two transport format combinations. The data rate of the multiplexed transport channels under the first transport format combination requires a spreading factor of 32, i.e., each channel symbol is spread by a 32 chip sequence. With the second transport format combination, the multiplexed transport channels has a smaller data rate and only requires a spreading factor 64. The channelization code of length 64 is equal to the concatenation of the 32 chip channelization code used under the first transport format combination. Despreading with the 64 chip code can therefore be accomplished by first despreading consecutive 32 chip segments of the received signal, storing the two results in a buffer, and summing, that is linearly combining them. (See TS section 4.3.1 of the $3^{rd}$ Generation Partnership Project (3GPPP) TS 25.213 v3.2.0.) The combining coefficient utilized by linear combiner 303 are based upon current transport format combination being utilized, and are input from logic circuitry 313.

The resulting binary sequence are routed to de-multiplexer 305. In particular, de-multiplexer 305 de-multiplexes the data stream according to a particular transport format combination (in this example $TFC_n$). This results in I data streams, one for each transport channel. This is followed by rate de-matching circuitry 307 that serves to insert dummy information bits where bits were punctured in the rate matcher 203 (FIG. 2) or combine bits where bits were repeated in the rate matcher 203 (FIG. 2).

The I data streams are each decoded and passed to CRC check circuitry 311, where an appropriate CRC metric is obtained for each channel. The data stream is also stored in storage 315. The CRC metrics are then passed to logic circuitry 313 where an appropriate transport format combination metric is determined for $TFC_n$. The above process continues (in serial or parallel) until a transport format combination metric is determined for all possible transport format combinations. Once a transport format combination metric has been determined for all transport format combinations, logic unit 313 instructs storage 315 to pass the decoded data associated with the largest transport format combination metric.

Determination of Transport Format Combination Metric

As described above, transmitter 200 encodes, rates matches and combines the plurality of transport channels into a single binary sequence. The sequence is modulated and transmitted. Receiver 300 estimates this sequence and, not knowing the format combination in force, makes estimates of the information bits under each possible format combination hypothesis. The estimate of ith transport channel data vector under the hypothesis of format combination k is denoted $\hat{u}_i^k$.

Therefore, for each hypothesized format combination, k, k=1, 2, ... K, a set of estimated vectors $\{\hat{u}_i^k, i = 1, 2, \ldots, I\}$ are generated. Let $c_i^k$ be equal to '1' if the ith transport channel data estimate, $\hat{u}_i^k$, under the format combination hypothesis k, is correct, i.e., is equal to the true ith transport channel data $u_i$:

$$c_i^k = \begin{cases} 1, & \hat{u}_i^k = u_i \\ 0, & \hat{u}_i^k \neq u_i \end{cases}, i = 1, 2, \ldots, I \text{ and } k = 1, 2, \ldots, K \quad (1)$$

In other words, $c_i^k$ is equal to '1' when the decoded data for the ith transport channel is correct.

Define $\underline{c}^k$ to be the vector $$\underline{c}^k = [c_1^k c_2^k \ldots c_I^k], k = 1, 2, \ldots, K \quad (2)$$

and the collection of these vectors into the matrix C $$C = [\underline{c}^1 \underline{c}^2 \ldots \underline{c}^K]^T. \quad (3)$$

Obviously, given k=k, matrix C has the following form:

$$C = \begin{bmatrix} \underline{0} \\ \vdots \\ \underline{0} \\ \underline{c}^k \\ \underline{0} \\ \vdots \\ \underline{0} \end{bmatrix} = \begin{bmatrix} 0 & 0 & \cdots & 0 \\ \vdots & & & \vdots \\ 0 & 0 & & 0 \\ c_1^k & c_2^k & \cdots & c_I^k \\ 0 & 0 & & 0 \\ \vdots & & & \vdots \\ 0 & 0 & \cdots & 0 \end{bmatrix}$$

where $$P(c_i^k = 0) = P(\hat{u}_i^k \neq u_i | k = k) = e_i^k, i = 1, 2, \ldots, I \text{ and} \quad (4)$$

$$P(c_i^k = 1) = P(\hat{u}_i^k = u_i | k = k) = 1 - e_i^k, i = 1, 2, \ldots, I. \quad (5)$$

A CRC check is performed on each of the estimated transport channel data vectors $\{\hat{u}_i^k, i = 1, 2, \ldots, I\}$ for each transport combination hypothesis to yield a set of binary valued variables, $\{r_i^k, i = 1, 2, \ldots, I\}$, where k=1, 2, ... K, $r_i^k$ is equal to '1' if the $p_i$ bit CRC of the ith transport channel passes on the vector on vector $\underline{u}_1^k$ and '0' otherwise.

The CRC checks corresponding to format combination k are organized into the vector $$\underline{r}^k = [r_1^k r_2^k \ldots r_I^k], k = 1, 2, \ldots, K \quad (6)$$

and the combination of these vectors into the observation matrix R:

$$R = [\underline{r}^1 \underline{r}^2 \ldots \underline{r}^K]^T. \quad (7)$$

The problem is to estimate k∈{1, 2, ..., K}, the transport format combination, given the set of CRC checks R. The solution would then be $$\hat{k} = \underset{k \in \{1,2,\ldots,K\}}{\operatorname{argmax}} \{P(R, C, k)\}. \quad (8)$$

Decomposition of P(R,C,k):

Taking the log of P(R,C,k) gives $$\ln P(R, C, k) = \ln P(R | C, k) + \ln P(C | k) + \ln P(k) \quad (9)$$

$$= \ln P(R | \underline{c}^k, k) + \ln P(\underline{c}^k | k) + \ln P(k)$$

The first term can be simplified by making the reasonable assumption that $\underline{r}^1, \underline{r}^2, \ldots \underline{r}^K$ are conditionally independent given $\underline{c}^k$ and k. We then have $$\ln P(R, C, k) = \sum_{\substack{j=1 \\ j \neq k}}^{K} \ln P(\underline{r}^j | \underline{c}^k, k) + \ln P(\underline{r}^k | \underline{c}^k, k) + \quad (10)$$

$$\ln P(\underline{c}^k | k) + \ln P(k).$$

The first two terms are two statistics based on received data. The remaining terms are a priori information.

Calculation of $\sum_{\substack{j=1 \\ j \neq k}}^{K} \ln P(\underline{r}^j | \underline{c}^k, k)$:

The CRC results for the transport channel data estimate vectors under the transport format combination hypothesis different from the one in force are independent of the correctness of the transport channel data estimate under the hypothesis of the transport combination in force, i.e., $$P(\underline{r}^j | \underline{c}^k, k) = P(\underline{r}^j | k), j \neq k. \quad (11)$$

The CRC results for different transport channels are also independent $$\ln P(\underline{r}^j \mid k) = \sum_{i=1}^{I} \ln P(r_i^j \mid k), \quad j \neq k. \tag{12}$$

The individual term in above is the log of the probability of the CRC passing for a wrong transport format combination. A common approximation to this probability is given by $$P(r_i^j \mid k) = \begin{cases} 2^{-p_i}, & r_i^j = 1 \\ 1 - 2^{-p_i}, & r_i^j = 0 \end{cases} \tag{13}$$

or $$\ln P(r_i^j \mid k) = \begin{cases} -p_i, & r_i^j = 1 \\ \ln(1 - 2^{-p_i}) \approx 0, & r_i^j = 0. \end{cases} \tag{14}$$

We therefore have $$\sum_{\substack{j=1 \\ j \neq k}}^{K} \ln P(\underline{r}^j \mid \underline{c}^k, k) = \sum_{\substack{j=1 \\ j \neq k}}^{K} \sum_{i=1}^{I} \ln P(r_i^j \mid k) = -\sum_{\substack{j=1 \\ j \neq k}}^{K} \sum_{i=1}^{I} p_i r_i^j. \tag{15}$$

Calculation of $\ln P(\underline{r}^k \mid \underline{c}^k, k)$:
Under AWGN channel, the CRC results of the transport channels are independent $$\ln P(\underline{r}^k \mid \underline{c}^k, k) = \sum_{i=1}^{I} \ln P(r_i^k \mid c_i^k, k). \tag{16}$$

The terms in the above can be evaluated from the following:

$$P(r_i^k \mid c_i^k, k) = \begin{cases} 1, & c_i^k = 1, r_i^k = 1 \\ 0, & c_i^k = 1, r_i^k = 0 \\ 2^{-p_i}, & c_i^k = 0, r_i^k = 1 \\ 1 - 2^{-p}, & c_i^k = 0, r_i^k = 0 \end{cases} \tag{17}$$

or $$\ln P(r_i^k \mid c_i^k, k) = \begin{cases} 0, & c_i^k = 1, r_i^k = 1 \\ -\infty, & c_i^k = 1, r_i^k = 0 \\ -p_i, & c_i^k = 0, r_i^k = 1 \\ 0, & c_i^k = 0, r_i^k = 0 \end{cases}. \tag{18}$$

Calculation of $\ln P(\underline{c}^k \mid k)$:
Calculation of $\ln P(\underline{c}^k \mid k)$ requires the joint transport channel data block error rates. If these errors are independent, which is the case for AWGN channel, we have $$\ln P(\underline{c}^k \mid k) = \sum_{i=1}^{I} \ln P(c_i^k \mid k) = \begin{cases} \sum_{i=1}^{I} \ln e_i^k, & c_i^k = 0 \\ \sum_{i=1}^{I} \ln(1 - e_i^k), & c_i^k = 1 \end{cases}. \tag{19}$$

Calculation of $\ln P(k)$:
Assume the transmission of each transport format is equally likely. We then have $$\ln P(k) = -\ln K \tag{20}$$

which is a constant.

MAP Detection:

The MAP rule discussed before can be rewritten as $$\hat{k} = \underset{k}{\mathrm{argmax}} \left\{ -\sum_{\substack{j=1 \\ j \neq k}}^{K} \sum_{i=1}^{I} p_i r_i^j + \underset{\underline{c}^k}{\max} \left\{ \sum_{i=1}^{I} \ln P(r_i^k \mid c_i^k, k) + \sum_{i=1}^{I} \ln P(c_i^k \mid k) \right\} \right\} \tag{21}$$

$$= \underset{k}{\mathrm{argmax}} \left\{ \sum_{i=1}^{I} p_i r_i^k + \underset{\underline{c}^k}{\max} \left\{ \sum_{i=1}^{I} \ln P(r_i^k \mid c_i^k, k) + \sum_{i=1}^{I} \ln P(c_i^k \mid k) \right\} \right\}.$$

For a given $\underline{r}^k$, the $\underline{c}^k$ which maximizes $$\sum_{i=1}^{I} \ln P(r_i^k \mid c_i^k, k) + \sum_{i=1}^{I} \ln P(c_i^k \mid k) \tag{22}$$

can be found from the following two observations:

1) If $r_i^k = 0$, then the first term in (22) is $-\infty$ unless $c_i^k 0$. Therefore $$\underset{\underline{c}^k}{\max} \left\{ \sum_{i=1}^{I} \ln P(r_i^k \mid c_i^k, k) + \sum_{i=1}^{I} \ln P(c_i^k \mid k) \right\} = \sum_{i=1}^{I} \ln e_i^k, \quad c_i^k = r_i^k = 0. \tag{23}$$

2) If $r_i^k = 1$, then $$\sum_{i=1}^{I} \ln P(r_i^k \mid c_i^k, k) + \sum_{i=1}^{I} \ln P(c_i^k \mid k) = \begin{cases} -p_i + \sum_{i=1}^{I} \ln e_i^k, & c_i^k = 0 \\ \sum_{i=1}^{I} \ln(1 - e_i^k), & c_i^k = 1 \end{cases} \tag{24}$$

Assuming $e_i^k < 0.5$, $i = 1, 2, \ldots, I$, $k = 1, 2, \ldots, K$, we have $$\underset{\underline{c}^k}{\max} \left\{ \sum_{i=1}^{I} \ln P(r_i^k \mid c_i^k, k) + \sum_{i=1}^{I} \ln P(c_i^k \mid k) \right\} = \sum_{i=1}^{I} \ln(1 - e_i^k), \tag{25}$$

$$c_i^k = r_i^k = 1.$$

Combining (23) and (25), we know that the maximizing $\underline{c}^k$ is equal to $\underline{r}^k$, i.e., $$\underset{\underline{c}^k}{\max} \left\{ \sum_{i=1}^{I} \ln P(r_i^k \mid c_i^k, k) + \sum_{i=1}^{I} \ln P(c_i^k \mid k) \right\} = \sum_{i=1}^{I} \ln e_i^k + \tag{26}$$

$$r_i^k (\ln(1 - e_i^k) - \ln e_i^k)$$

$$= \sum_{i=1}^{I} \ln e_i^k + r_i^k \ln \frac{1 - e_i^k}{e_i^k}.$$

Substituting (26) into (21) gives $$\hat{k} = \operatorname*{argmax}_{k \in \{1,2,\ldots,K\}} \left\{ \sum_{i=1}^{I} \left( p_i r_i^k + r_i^k \ln \frac{1-e_i^k}{e_i^k} + \ln e_i^k \right) \right\} \quad (27)$$

$$= \operatorname*{argmax}_{k \in \{1,2,\ldots,K\}} \left\{ \sum_{i=1}^{I} \left( \left( p_i + \ln \frac{1-e_i^k}{e_i^k} \right) r_i^k + \ln e_i^k \right) \right\}.$$

Figure 4:
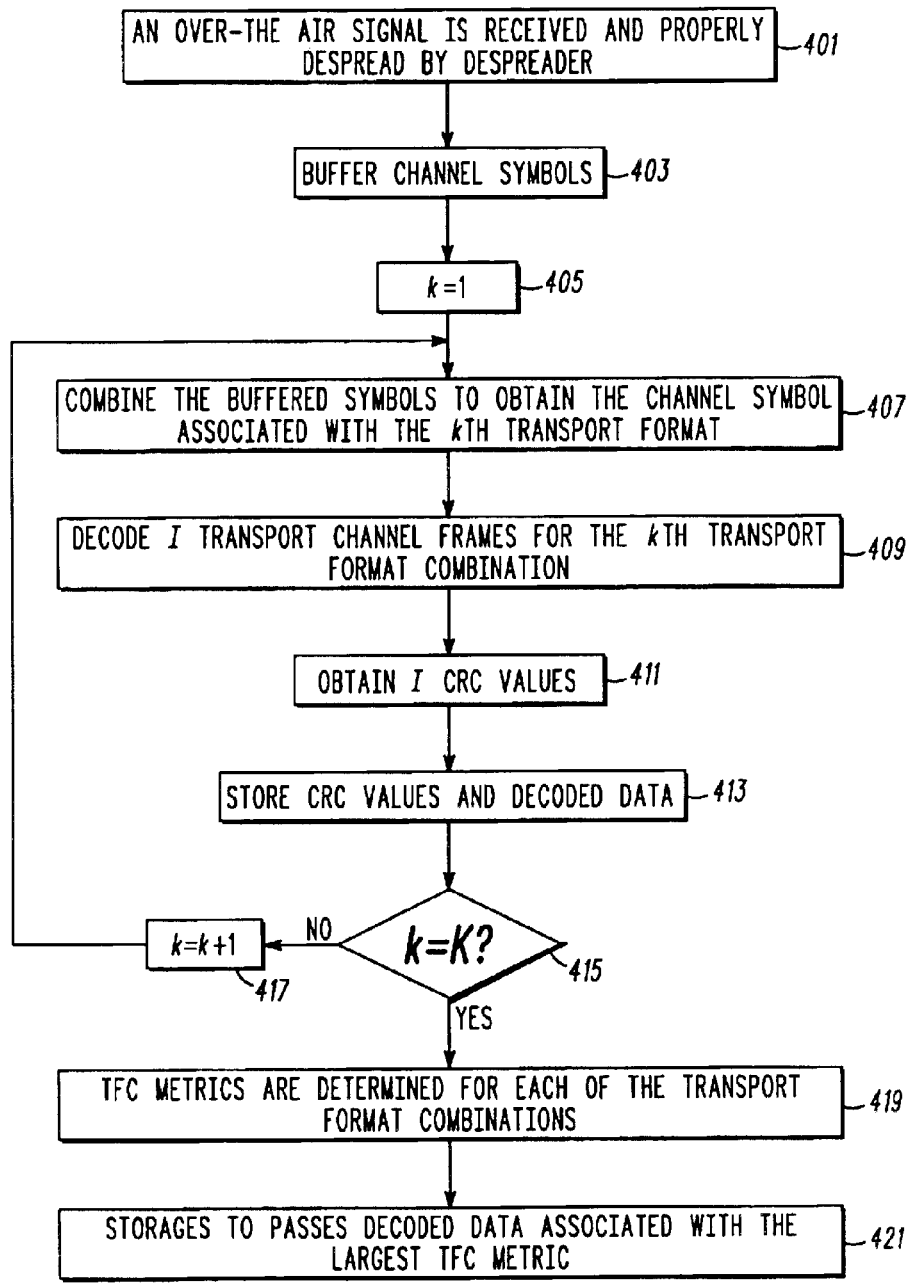
FIG. 4 is a flow chart showing operation of the receiver in accordance with the preferred embodiment of the present invention.

FIG. 4 is a flow chart showing operation of receiver 300 in accordance with the preferred embodiment of the present invention. The following flow chart describes the procedure for determining a transport format from the K hypothesized transport format combinations using the results derived above.

The logic flow begins at step 401 where an over-the-air signal is received and properly despread by despreader 301 according to the shortest channel symbol (i.e., the channel symbol spread by the shortest channelization code) in the transport format combination set. The resulting shortest symbol stream exits despreader 301. It should be noted that different transport format combinations require further despreading (linear combiner 303) with different channelization codes. In particular, since spreading was performed by the transmitter by spreading with differing-length channelization codes, despreading needs to take place utilizing these differing-length codes. Since each transport format combination requires further despreading with differing channelization codes by linearly combining the shortest symbols, the shortest symbol stream exiting despreader 301 needs to be buffered at the shortest symbol level for at least a whole radio frame (step 403).

To avoid buffering the signal at the chip level, in the preferred embodiment of the present invention the channelization codes used for different transport format combinations of the transport format combination set all belong to the same code family. (See TS section 4.3.1.1 of the 3$^{rd}$ Generation Partnership Project (3GPPP) TS 25.213 v3.2.0). Therefore, only the channel symbols with the shortest channelization code (i.e., the parent code) need to be buffered at step 403. Since the shortest code is the parent code of all other codes, the channel symbols for different length of channel codes can be obtained by linear combination of the shortest channel symbols.

As discussed above, a transport format combination metric will need to be obtained for each transport format combination. Because of this, at step 405 k is set to 1 and logic unit 313 instructs despreader 307 to despread the buffered signal using a channelization code associated with the kth transport format (step 407). In particular, at step 407 the physical channel symbols are despread based on the shortest channelization codes $C_{ch,SF,i'}$ used in the transport format combination set, where $$i' = \min_i \{i = SF_k/4, k = 1, 2, \ldots, K\}, SF_k$$

is the spreading factor for the kth transport format combination. The physical channel symbols are demodulated under transport format combination hypothesis TFC$^k$ using the linear combination of the demodulated shortest channel symbols. The I transport channel frames for the kth transport format combination is decoded (step 409) and I CRC values obtained (step 411). In particular, for the kth transport format combination a CRC is obtained for each of the I channels. So for transport combination k, I CRC values are obtained (one for each data channel) to produce the decoding information:

$$\{CRC_i^k, i = 1, 2, \ldots, I\}.$$

These values and the decoded data are stored in storage 315 (step 413) and the logic flow continues to step 415 where it is determined if k=K, and if not k is incremented (step 417) and the logic flow returns to step 407, otherwise the logic flow continues to step 419 where transport format combination metrics are determined for each of the transport format combinations. In particular, when block error rates $$e_i^k, i = 1, 2, \ldots, I, k = 1, 2, \ldots, K$$

are not available, the simplified form of (27) is used to determine the transport format combination:

$$\hat{k} = \operatorname*{argmax}_{k \in \{1,2,\ldots,K\}} \left\{ \sum_{i=1}^{I} p_i CRC_i^k \right\}$$

where $p_1 \in \{24, 16, 12, 8, 0\}$ and $$CRC_i^k$$

equals to 1 if the TTI frame under hypothesis $$TF_i^k$$

for the ith transport channel passes the CRC check; and $$CRC_i^k$$

equals to 0 if the TTI frame under hypothesis $$CRC_i^k$$

fails the CRC check or CRC result is not available, e.g., in the middle of the TTI boundary which happens when the transport format for different transport channels have different TTI lengths.

Whenever the block error rates are made available through measurement, (27) can be used for better accuracy:

$$\hat{k} = \operatorname*{argmax}_{k \in \{1,2,\ldots,K\}} \left\{ \sum_{i=1}^{I} \left( \left( p_i + \ln \frac{1-e_i^k}{e_i^k} \right) CRC_i^k + \ln e_i^k \right) \right\}.$$

The estimated transport format for the ith transport channel is then $$TF_i^{\hat{k}}.$$

It should be noted that if all CRCs are zero, the entire frame shall be declared as erasure. The transport format is assumed to be the same as previous transport format.

Finally, at step 421, logic unit 313 instructs storage 315 to pass decoded data associated with the largest transport format combination metric.

While the invention has been particularly shown and described with reference to a particular embodiment, it will be understood by those skilled in the art that various changes in form and details may be made therein without departing from the spirit and scope of the invention. It is intended that such changes come within the scope of the following claims.

What is claimed is:

1. A method for blind transport format detection, the method comprising the steps of:

receiving an over-the-air signal comprising a plurality of transport channels multiplexed onto the over-the-air signal, wherein each of the plurality of transport channels comprises one of a plurality of possible transport formats;

determining a plurality of transport format combinations;

for each of the plurality of transport format combinations, determining a Cyclic Redundancy Check (CRC) metrics for each channel component of the transport format combination;

combining the CRC metric of each channel component to form a transport format combination metric; and determining which one of the plurality of transport combinations was utilized based on the transport format combination metrics.

2. The method of claim 1 wherein the plurality of possible transport formats has a particular bit rate.

3. The method of claim 1 wherein the step of determining which one of the plurality of transport combinations was utilized comprises determining which one of the plurality of transport combinations was utilized based on a largest transport format combination metric.

4. The method of claim 3 further comprising determining the largest transport format combination metric according to $$\hat{k} = \underset{k \in \{1,2,\ldots,K\}}{\operatorname{argmax}} \left\{ \sum_{i=1}^{I} \left[ \left( p_i + \ln \frac{1-e_i^k}{e_i^k} \right) CRC_i^k + \ln e_i^k \right] \right\},$$

wherein $p_i \in \{24,16,12,8,0\}$ is a number of CRC bits for an ith transport channel and $$CRC_i^k$$

equals to 1 if a TTI frame under hypothesis $$TF_i^k$$

for an ith transport channel passes a CRC check; and $$CRC_i^k$$

equals to 0 if the TTI frame under hypothesis $$TF_i^k$$

fails the CRC check or a CRC result is not available; and wherein K is a total number of format combinations possible.

5. The method of claim 3 further comprising determining the largest transport format combination metric according to $$\hat{k} = \underset{k \in \{1,2,\ldots,K\}}{\operatorname{argmax}} \left\{ \sum_{i=1}^{I} p_i CRC_i^k \right\},$$

wherein $p_i \in \{24,16,12,8,0\}$ is a number of CRC bits for an ith transport channel and $$CRC_i^k$$

equals to 1 if a TTI frame under hypothesis $$TF_i^k$$

for an ith transport channel passes a CRC check; and $$CRC_i^k$$

equals to 0 if the TTI frame under hypothesis $$TF_i^k$$

fails the CRC check or a CRC result is not available; and wherein K is a total number of format combinations possible.

6. An apparatus comprising:

a de-multiplexer having a data stream as an input, wherein the data stream comprises a plurality of transport channels, each having one of a plurality of possible transport channel formats, the de-multiplexer outputting a plurality of channels based on a particular transport format combination;

a plurality of Cyclic Redundancy Checking (CRC) circuitry, each having one of the plurality of channels as an input and outputting a CRC metric for the channel; and a logic unit having the CRC metrics from the plurality of channels as an input and outputting a transport format combination metric based on the CRC metrics.

7. The apparatus of claim 6 further comprising storage outputting data based on a transport format combination corresponding to a largest transport format combination metric.

8. The apparatus of claim 6 wherein the transport format combination metric is based on $$\hat{k} = \underset{k \in \{1,2,\ldots,K\}}{\operatorname{argmax}} \left\{ \sum_{i=1}^{I} p_i CRC_i^k \right\},$$

wherein $p_i \in \{24,16,12,8,0\}$ is a number of CRC bits for an ith transport channel and $$CRC_i^k$$

equals to 1 if a TTI frame under hypothesis $$TF_i^k$$

for an ith transport channel passes a CRC check; and $CRC_i^k$ equals to 0 if the TTI frame under hypothesis $TF_i^k$ fails the CRC check or a CRC result is not available; and wherein K is a total number of format combinations possible.

9. The apparatus of claim 6 wherein the transport format combination metric is based on $$\hat{k} = \underset{k \in \{1,2,\ldots,K\}}{\operatorname{argmax}} \left\{ \sum_{i=1}^{I} \left( \left( p_i + \ln \frac{1-e_i^k}{e_i^k} \right) CRC_i^k + \ln e_i^k \right) \right\},$$

wherein $p_i \in \{24,16,12,8,0\}$ is a number of CRC bits for an ith transport channel and $CRC_i^k$ equals to 1 if a TTI frame under hypothesis $TF_i^k$ for an ith transport channel passes a CRC check; and $CRC_i^k$ equals to 0 if the TTI frame under hypothesis $TF_i^k$ fails the CRC check or a CRC result is not available; and wherein K is a total number of format combinations possible.

* * * * *